(12) United States Patent
Steffens et al.

(10) Patent No.: US 6,335,106 B1
(45) Date of Patent: Jan. 1, 2002

(54) SLIDE BEARING MATERIAL

(75) Inventors: Thomas Steffens, Bad-Rappenau; Werner Schubert, Wiesloch, both of (DE)

(73) Assignee: KS Gleitlager GmbH, St. Leon-Rot (DE)

( * ) Notice: Subject to any disclaimer, the term of this patent is extended or adjusted under 35 U.S.C. 154(b) by 0 days.

(21) Appl. No.: 09/462,776

(22) PCT Filed: Jul. 17, 1998

(86) PCT No.: PCT/EP98/04461

§ 371 Date: Jan. 14, 2000

§ 102(e) Date: Jan. 14, 2000

(87) PCT Pub. No.: WO99/04049

PCT Pub. Date: Jan. 28, 1999

(30) Foreign Application Priority Data

Jul. 17, 1997 (DE) .......................... 197 30 549

(51) Int. Cl.⁷ .................. C22C 21/00; F16C 33/12; B32B 15/02
(52) U.S. Cl. .................. 428/653; 420/530; 420/537; 420/538; 384/912
(58) Field of Search .................. 428/653; 420/530, 420/537, 538; 384/912

(56) References Cited

U.S. PATENT DOCUMENTS 4,412,972 A * 11/1983 Mori
4,789,607 A * 12/1988 Fujita et al.
4,973,523 A * 11/1990 Nehaus et al.
5,162,100 A * 11/1992 Tanaka et al.
5,362,574 A * 11/1994 Tanaka et al.
5,384,205 A * 1/1995 Tanaka et al.
5,470,666 A * 11/1995 Tanaka et al.

FOREIGN PATENT DOCUMENTS

| DE | 3214303 A1 | 1/1983 |
| DE | 4004703 A1 | 9/1990 |
| DE | 4312537 A1 | 11/1993 |
| DE | 4332433 A1 | 5/1994 |
| DE | 19612657 A1 | 10/1996 |
| GB | 2 103 240 * | 7/1981 |

* cited by examiner

*Primary Examiner*—Blaine Copenheaver
*Assistant Examiner*—Jason Savage
(74) *Attorney, Agent, or Firm*—Jones, Tullar & Cooper, P.C.

(57) ABSTRACT

The invention relates to an aluminium-based slide bearing material, comprising an aluminium alloy with 10–25% wt. tin, as well as copper, nikel and manganese additions. The invention seeks to provide a material with improved load-bearing capacity and formability. To this end, copper, nickel and manganese are each present at a portion of 0.2 to 2% wt., and 0.2 to 2% wt. silicon is added. Furthermore, the ratio of the percentage by weight of copper to the percentage by weight of nickel, and the ratio of the percentage by weight of manganese to the percentage by weight of silicon is between 0.6 and 1.5.

10 Claims, 4 Drawing Sheets

Table I:

| Alloy | Casting Method | Hardness (after 250 C) HB2.5/31.25/30 | Shaping Ability | Scoring Resistance FOM | Remarks |
|---|---|---|---|---|---|
| AlSn17Cu1 | K, KS | 30 | ++ | 1 | Corresponding to KS 985 |
| AlSn17Cu1Si2 | ” | 35 | + | 7 | Problems during rolling |
| AlSn17Cu1Si4 | ” | 34 | − | 8 | Large Problems during rolling |
| AlSn17Cu1Si6 | ” | 37 | − | 4 | |
| AlSn17Cu2 | ” | 42 | ++ | 3 | |
| AlSn12Cu2Mn1Ni0.3 | DB | ~50 | + | n.b. | Problems during rolling |
| AlSn12Cu2Mn2Ni0.6 | ” | ~60 | − | n.b. | large problems during rolling |
| AlSn12Cu3Mn1 | ” | ~60 | − | n.b. | (coarse Al₂Cu precipitations) |
| AlSn12Cu3.5Mn2 | ” | ~70 | − | n.b. | great matrix hardness |
| AlSn12Si3Cu2Ni2 | K,KS | 42 | + | 6 | Problems during rolling |
| AlSn12Si3Cu2Ni2Mn1 | ” | 49 | + | 10 | |
| AlSn12Si1Cu1Ni1Mn1 | | ≥50 | ++ | 10 | |

K = Chilled casting
KS = Continuous casting
DB = Thin strip casting

++ = Can be rolled even at large groove reductions
+ = Can be rolled only with small groove reductions
− = Hard to roll Table I:

| Alloy | Casting Method | Hardness (after 250 C) HB2.5/31.25/30 | Shaping Ability | Scoring Resistance FOM | Remarks |
|---|---|---|---|---|---|
| AlSn17Cu1 | K, KS | 30 | ++ | 1 | Corresponding to KS 985 |
| AlSn17Cu1Si2 | " | 35 | + | 7 | Problems during rolling |
| AlSn17Cu1Si4 | " | 34 | − | 8 | Large Problems during rolling |
| AlSn17Cu1Si6 | " | 37 | − | 4 | |
| AlSn17Cu2 | " | 42 | ++ | 3 | |
| AlSn12Cu2Mn1Ni0.3 | DB | ~50 | + | n.b. | Problems during rolling |
| AlSn12Cu2Mn2Ni0.6 | " | ~60 | − | n.b. | large problems during rolling |
| AlSn12Cu3Mn1 | " | ~60 | − | n.b. | (coarse Al$_2$Cu precipitations) |
| AlSn12Cu3.5Mn2 | " | ~70 | − | n.b. | great matrix hardness |
| AlSn12Si3Cu2Ni2 | K,KS | 42 | + | 6 | Problems during rolling |
| AlSn12Si3Cu2Ni2Mn1 | " | 49 | + | 10 | |
| AlSn12Si1Cu1Ni1Mn1 | | ≥50 | ++ | 10 | |

++ = Can be rolled even at large groove reductions
+ = Can be rolled only with small groove reductions
− = Hard to roll K = Chilled casting
KS = Continuous casting
DB = Thin strip casting

FIG. 1

Table II:

| Charge | Alloy | Phases | | | | | |
|---|---|---|---|---|---|---|---|
| | | Sn | Si | $Al_2Cu$ | $Al_{15}Si_2(Mn)_3$ | $Al_3(Ni,Cu)$ |
| 2167 | AlSn12Cu1Mn1.5Si1.5 | ++ | + | + | + | − |
| 2168 | AlSn12Cu2.5Mn1Si3 | ++ | ++ | ++ | + | − |
| 2169 | AlSn12Cu1Mn1Si1Ni1 | ++ | + | 0 | + | + |
| 2170 | AlSn12Cu2Mn1Si2Ni1 | ++ | + | + | + | + |
| Designations in Figs. 3–6 | | 1 | 2 | 3 | 4 | 5 |

− : Not present
+ : Present
++ : Present in large amounts
0 : Hardly detectable

FIG. 2

Batch 2167
AlSn12Cu1Mn1,5Si1,5

Batch 2168
AlSn12Cu2,5Mn1Si3

Batch 2169
AlSn12Cu1Mn1Si1Ni1

Batch 2170
AlSn12Cu2Mn1Si2Ni1

SLIDE BEARING MATERIAL

FIELD OF THE INVENTION

The present invention relates to a slide bearing material with aluminum as the basic material, consisting of an aluminum alloy with 10 to 25 weight-% of tin, and additions of copper, nickel and manganese.

BACKGROUND OF THE INVENTION

Such a slide bearing material is known, for example, from German Patent, DE 40 04 703 A1. The single exemplary embodiment teaches an aluminum alloy of a composition of AlSn10Ni2Mn1Cu0.5, wherein a lead addition can also be used instead of the tin addition. With such aluminum alloys used as a slide bearing material, a "soft phase" in the form of a tin, or also lead precipitation is required for assuring good emergency running properties of a bearing made of the slide bearing material. Hard dirt particles and rubbed-off parts are taken up in this soft phase or are embedded in it. The soft phase can also be adapted to geometric conditions. The soft phase of tin, which cannot be dissolved in the aluminum, is contained in the form of block-shaped precipitations in the matrix-forming aluminum.

It is known to add copper to increase the strength of the aluminum matrix. Copper forms intermetallic phases with aluminum, so-called mechanically resistant material phases, such as $Al_2Cu$ and finely dispersed pre-stages thereof, which cause an increase in the strength of the aluminum if they are present in finely distributed precipitations ($\leq 1$ μm). The load carrying ability and fatigue resistance of a slide bearing material made from such an alloy is thus increased. Such an aluminum alloy. AlSn15Cu2 is known by the commercial name KS 985.3. This alloy which already has excellent tribologic properties, however, for applications under extreme load conditions, for example as a connecting rod bearing in modern internal combustion engines, requires improvement.

This was attempted to be achieved by the addition of manganese and nickel to the aluminum alloy known from previously noted German Patent, DE 40 04 703 A1, by means of which the proportion of the mechanically resistant material phase was intended to be increased namely, in accordance with the teaching contained in this Patent publication, in particular in the vicinity of the tin preparations, in order to achieve an improved bonding of the tin precipitation in the aluminum matrix because of the affinity of the tin for the nickel and the manganese.

There is also the belief that a certain proportion of mechanically resistant material phases or precipitations has a positive effect on good wear resistance in that on the surface the mechanically resistant material phases cause the finish grinding of the sliding partner, for example the crankshaft, so that the rough tips of the sliding partner made of steel can be worn off. The load bearing capacity of the bearing material is also said to be improved by the mechanically resistant material phases.

However, increases in the proportions of intermetallic mechanically resistant phases also entails problems with respect to fatigue resistance and also from the standpoint of production ability per se. For example, cracks occur during shaping, in particular when cold-cladding the aluminum alloy on steel, which requires a groove of approximately 50% shaping.

SUMMARY OF THE INVENTION

An object of the present invention is to improve an alloy of the type described at the outset in such a way that it has a greater load bearing capacity than the known aluminum-tin-copper or aluminum-tin-copper-nickel alloys, as well as an improved ability of being shaped, in particular being cladded.

This object is attained by a slide bearing material of the type mentioned at the outset, which is distinguished in that the copper, nickel and manganese each are present at a proportion of 0.2 to 2 weight-%, and that 0.2 to 2 weight-% of silicon is provided as a further addition, and that the ratio of the proportion in weight-% of copper to the proportion in weight-% of nickel, and the ratio of the proportion in weight-% of manganese to the proportion in weight-% of silicon lies between 0.6 and 1.2.

BRIEF DESCRIPTION OF THE DRAWINGS

These and other features, aspects, and advantages of the present invention will become better understood with reference to the following description, appended claims, and accompanying drawings where:

FIG. 1 is a table of alloy compositions according to the present invention along with a listing of pertinent data regarding the alloy compositions.

FIG. 2 is a table of analyses of alloy compositions according to the present invention listing various intermetallic phases present after heat treatment at 510° C.

DETAILED DESCRIPTION OF THE INVENTION

Figure 3:
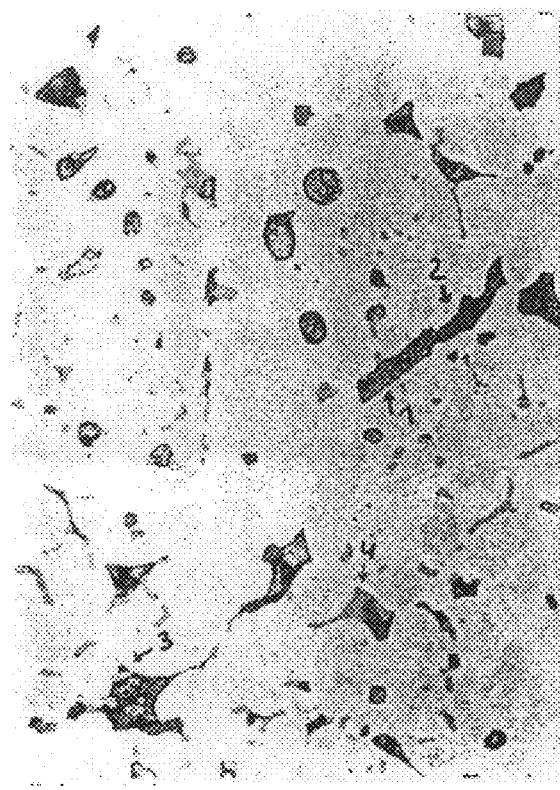
FIG. 3 is a photograph of a slightly etched longitudinal ground section of the alloy charge 2167 (listed in FIG. 2).

By means of the present invention it is proposed to add copper and nickel to the aluminum alloy in such amounts that an intermetallic phase containing nickel and copper is formed, for example the intermetallic phase $Al_3(Ni, Cu)$. This means that preferably copper and nickel are added in equal amounts. The above mentioned ratio of the copper and nickel proportions preferably lies between 0.8 and 1.2.

It was found that nickel forms an intermetallic phase in the aluminum alloy, which is locally fixed and, in contrast to intermetallic aluminide phases exclusively containing copper, such as $Al_2Cu$, is stable during heat treatment. By means of this it is, prevented that the copper wanders inside the matrix during the heat treatment and results in a coarsening of the precipitation phases (this is referred to as Ostwald ripening). Such coarsening is undesirable, since the coarse precipitations represent potential fatigue and crack-forming places inside the alloy, which worsen the shaping ability and again reduce the load-bearing capacity. Because of the relatively high solubility of copper in the aluminum mix crystal, $Al_2Cu$ precipitations have a particular tendency toward coarsening.

It was moreover found by means of the present invention that an addition of manganese in view of an increase of oscillating stability is disadvantageous without the simultaneous addition of silicon. For example, it was found in connection with the alloy AlSn12Cu2Mn2Ni0.6, and that it has very poor rolling ability because of relatively coarse $Al_2Cu$ precipitations and because of too great a matrix hardness, which is caused by the elements copper and manganese. The samples obtained in Table 1 in accordance with FIG. 1 were produced by means of thin strip casting. These are not a part of the prior art.

As can be further seen from Table I, the addition of silicon to the aluminum-tin-copper alloy of the type in accordance with the species can cause an increase in hardness and a reduction of the susceptibility to wear by scoring, but the shaping ability is reduced to a great extent by this. The samples were produced by continuous casting. They also are not part of the prior art.

The penultimate line of Table 1 shows an AlSn12Si3Cu2Ni2Mn1 alloy. It has a Brinell hardness of 49 $B_H$ 2.5/31 and displays excellent tribologic properties. But the shaping ability is not satisfactory either with this combination and problems arise during rolling.

The fifth column of the table indicates the results of a measurement of the compressing resistance. Here, quality coefficients between 1 and 10 were assigned, wherein a quality coefficient above 5 indicates goods tribologic properties. For this purpose a disk made from crankcase steel is arranged horizontally and is caused to rotate. A pin, or a section in the form of a small plate, made of the slide bearing material to be tested, is pressed on the rotating disk surface under conditions of insufficient lubrication. Now the time until the first friction welding signs (scoring) appear is measured. The nominal time was set to 90 minutes as a function of the contact pressure and the speed of rotation of the disk, which is intended to correspond to a quality coefficient of 10. If the first friction welding signs already occur after 45 minutes, this corresponds to a quality coefficient of 5, and if the first signs of scoring already appear within the first 9 minutes, this corresponds to the completely unsatisfactory quality coefficient of 1. The values shown in the table are understood to be average values from at least five pin/disk tests.

Matrix hardness of more than 50 $B_H$ 2.5/31, 25/30 and a very good shaping ability are achieved with the alloy of the invention, AlSn12Cu1Ni1Mn1Si1. The quality coefficient for the scoring resistance is 10. The alloy material can be rolled well even at groove reductions of more than 50%. This is attributed to the mutual action of copper and nickel and the mutual action of manganese and silicon. Large manganese and copper contents in the matrix lead to a great matrix hardness (mixed crystal hardening). In the course of a heat treatment there is the tendency toward the formation of coarse, or respectively coarsening, mechanically resistant phases of the aluminum-copper-manganese type, which have a negative effect on the shaping ability and fatigue resistance. The formation of coarse aluminum-copper-manganese phases is prevented, or at least clearly reduced, by the addition of nickel and silicon, since preferably nickel-copper aluminide is formed on the one hand, and on the other manganese-silicon aluminide, which hardly tends toward signs of coarsening. In contrast to pure copper aluminides, the nickel-copper aluminides are present in fine dispersion, even after a heat treatment at 250 degrees. The reason for this is the extremely low solubility of nickel in the aluminum mix crystals.

A preferred precipitation phase of manganese in the presence of silicon is thermally stable $(Mn)_3Si_2Al_{15}$, which explains the working together of manganese with silicon. Thus, the addition of silicon and nickel prevents the formation of coarsening copper-manganese aluminides during the heat treatment. Silicon is the preferred "partner" of manganese, which for the above mentioned reasons has been shown to be advantageous.

The essential effect of the claimed nickel content as a function of the copper content consists in binding copper in the form of nickel-copper aluminide and in this way to repress, or respectively reduce, the precipitation of $Al_2Cu$. These $Al_2Cu$ precipitates have a particularly damaging effect on the shaping ability because they, in contrast to the thermally stable nickel-copper aluminides, become coarser during heat treatment and therefore represent potential starting points for cracks. Besides a portion of the copper is present in the matrix in the desired finely distributed form.

The alloys shown in Table II in accordance with FIG. 2 were tested as to their composition after a heat treatment at 510° for a period of eight hours and subsequent furnace cooling. In the course of this, pure tin and silicon phases, as well as undesired copper aluminide $Al_2Cu$, which tends toward coarsening, as well as manganese-silicon aluminide $Al_{15}Si_2(CuMnFe)_3$ which, because of the great affinity of manganese for silicon hardly contains copper and iron, but mainly manganese, and nickel-copper aluminide $Al_3(NiCu)$, were detected.

It can be seen in the table that, although the desired manganese-silicon aluminide and the copper-nickel aluminide are contained in the alloy in accordance with the invention, AlSn12Cu1Mn1Si1Ni1 (penultimate line), the undesired copper aluminide is present in a hardly detectable amount, while in the alloy AlSn12Cu2Mn1Si2Ni1 the interfering copper aluminide is present to such an extent that it has a negative effect on the shaping ability.

Al2lCu appears in even larger amounts in the alloy AlSn12Cu2, 5Mn1Si3 (second line), which contain no nickel.

Figure 4:
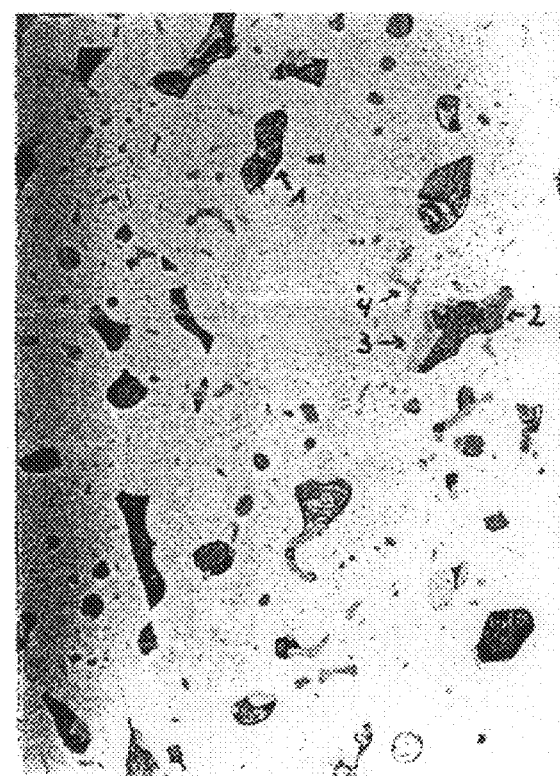
FIG. 4 is a photograph of a slightly etched longitudinal ground section of the alloy charge 2167 (listed in FIG. 2).
Figure 5:
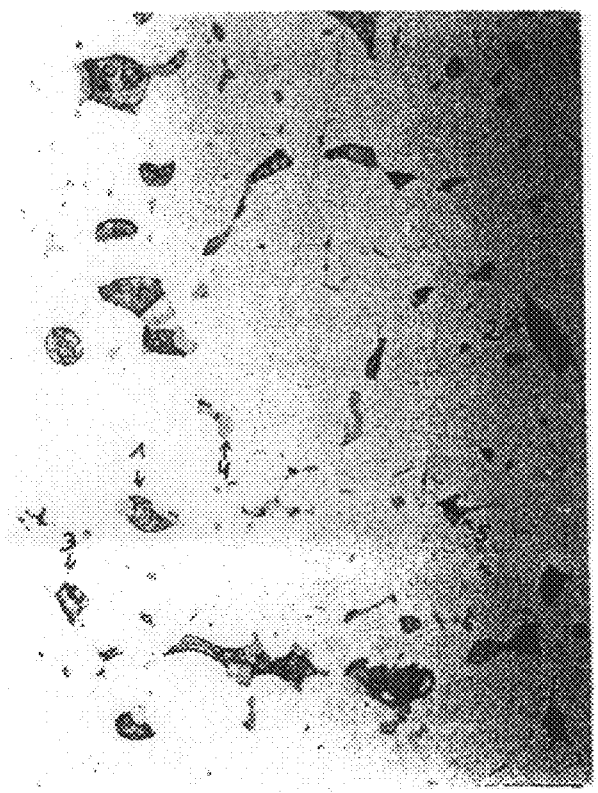
FIG. 5 is a photograph of a slightly etched longitudinal ground section of the alloy charge 2169 (listed in FIG. 2).
Figure 6:
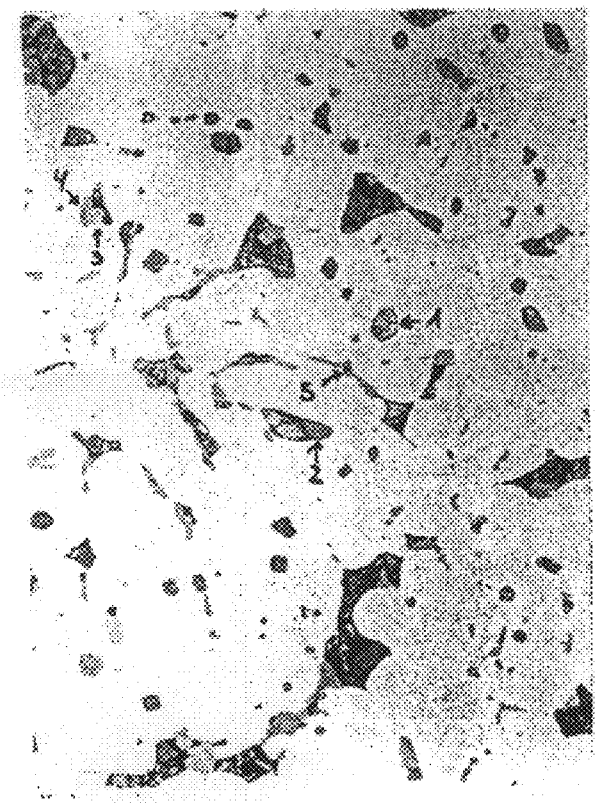
FIG. 6 is a photograph of a slightly etched longitudinal ground section of the alloy charge 2170 (listed in FIG. 2).

FIGS. 3 to 6 show photographs of a slightly etched longitudinal ground section of the alloys in Table 2 in a grid representation, namely after the described heat treatment. The phases in accordance with Table 2 are indicated by inserted arrows 1 to 5.

What is claimed is:

1. A slide bearing material of aluminium alloy, comprising:

10 to 25 weight % of tin; and
   0.2 to 2 weight % of each of copper, nickel, manganese and silicon,
   wherein the ratio of the proportion in weight % of copper to the proportion in weight % of nickel, and the ratio of the proportion in weight % of manganese to the proportion in weight % of silicon lies between 0.6 and 1.2.

2. The slide bearing material as defined in claim 1, wherein the ratio of the proportion in weight % of copper to the proportion in weight % of nickel lies between 0.8 to 1.2.

3. The slide bearing material as defined in claim 1, wherein the ratio of the proportion in weight % of manganese to the proportion in weight % of silicon lies between 0.8 to 1.2.

4. The slide bearing material as defined in claim 1, further comprising:

mechanically resistant precipitations which form an intermetallic phase $Al_3$ (Ni, Cu).

5. The slide bearing material as defined in claim 1, wherein the respective amount of copper and nickel in weight % is 0.7 to 1.3 weight %.

6. The slide bearing material as defined in claim 1, wherein the respective amount of manganese and silicon in weight % is 0.7 to 1.3 weight %.

7. The slide bearing material as defined in claim 1, wherein the weight % of tin is 10 to 20 weight %.

8. The slide bearing material as defined in claim 7, wherein the weight % of tin is 10 to 15 weight %.

9. A compound slide bearing material having a mechanically resistant support layer and a metallic slide layer applied thereto, said slide bearing material comprising: 10 to 25 weight % of tin and 0.2 to 2 weight % of each of copper, nickel, manganese and silicon, wherein the ratio of the proportion in weight % of copper to the proportion in weight % of nickel, and the ratio of the proportion in weight % of manganese to the proportion in weight % of silicon lies between 0.6 and 1.2.

10. The compound as defined in claim 9, wherein said metallic slide layer is applied to said mechanically resistant support layer by rolling.

* * * * *